United States Patent
Kim (10) Patent No.: US 10,285,019 B2
(45) Date of Patent: May 7, 2019

(54) SERVER, APPARATUS AND METHOD FOR PROVIDING CALL AVAILABILITY INFORMATION

(71) Applicant: HYUNDAI MOTOR COMPANY, Seoul (KR)

(72) Inventor: Seon Su Kim, Seongnam-si (KR)

(73) Assignee: Hyundai Motor Company, Seoul (KR)

(*) Notice: Subject to any disclaimer, the term of this patent is extended or adjusted under 35 U.S.C. 154(b) by 176 days.

(21) Appl. No.: 15/250,265

(22) Filed: Aug. 29, 2016

(65) Prior Publication Data

US 2017/0289772 A1 Oct. 5, 2017

(30) Foreign Application Priority Data

Apr. 5, 2016 (KR) .................. 10-2016-0041814

(51) Int. Cl.
| | |
|---|---|
| *H04M 1/60* | (2006.01) |
| *H04M 3/42* | (2006.01) |
| *G01C 21/36* | (2006.01) |
| *B60W 50/00* | (2006.01) |
| *H04M 3/436* | (2006.01) |
| *H04W 4/04* | (2009.01) |
| *H04M 1/725* | (2006.01) |

(52) U.S. Cl.
CPC ........ *H04W 4/046* (2013.01); *B60W 50/0097* (2013.01); *G01C 21/362* (2013.01); *H04M 3/436* (2013.01); *H04M 1/6075* (2013.01); *H04M 1/72577* (2013.01); *H04M 3/42348* (2013.01); *H04M 3/42365* (2013.01); *H04M 2203/651* (2013.01); *H04M 2207/18* (2013.01)

(58) Field of Classification Search
CPC ............ H04W 4/046; B60W 50/0097; H04M 1/6075; H04M 3/42365
See application file for complete search history.

(56) References Cited

U.S. PATENT DOCUMENTS

| | | | | |
|---|---|---|---|---|
| 2004/0203918 A1* | 10/2004 | Moriguchi | ............. | G01C 21/26 455/456.1 |
| 2005/0239479 A1* | 10/2005 | Bednasz | ........... | H04M 1/72572 455/456.1 |
| 2016/0205146 A1* | 7/2016 | Sugioka | .............. | H04L 65/1066 709/204 |

FOREIGN PATENT DOCUMENTS

| | | |
|---|---|---|
| KR | 10-2003-0024310 | 3/2003 |
| KR | 10-2005-0116722 A | 12/2005 |

(Continued)

*Primary Examiner* — Marisol Figueroa
(74) *Attorney, Agent, or Firm* — Brinks Gilson & Lione (57) ABSTRACT

A server, an apparatus, and a method for providing a call availability information of a driver are disclosed. A call availability information providing server may include a driving route calculating unit configured to receive a starting position and destination information transmitted from a vehicle terminal connected through a wireless communication network and to calculate a driving route corresponding to the received starting position and destination information; a call availability information generating unit configured to calculate a driving mode and a passing time per unit interval within the calculated driving route and to generate call availability information based on the calculated driving mode and passing time per unit interval when it is determined that a vehicle installed with the vehicle terminal is driving; and a call availability information transmitting unit configured to transmit the generated call availability information to the vehicle terminal.

11 Claims, 8 Drawing Sheets

(56) References Cited

FOREIGN PATENT DOCUMENTS

| KR | 10-0631586 | 9/2006 |
| KR | 10-1409417 | 6/2014 |
| KR | 10-2016-0003880 A | 1/2016 |
| KR | 10-2016-0029338 A | 3/2016 |

* cited by examiner

D1~Dn : Distance
V1~Vn : Average speed

A : Voice call interval (manual driving)
B : Call risk interval (transition interval)
C : Image call interval (autonomous driving)

Example 1)
• Hands-free connection, Highway high speed night driving.
  Sunny. Call safety point is 70.

Example 2)
• Hands-free disconnection, Downtown low speed driving.
  Foggy. Call safety point is 60.

Example 3)
• Hands-free disconnection, High speed driving.
  Call safety point is 10. Call bad

SERVER, APPARATUS AND METHOD FOR PROVIDING CALL AVAILABILITY INFORMATION

CROSS-REFERENCE TO RELATED APPLICATION

The present application claims priority to and the benefit of Korean Patent Application No. 10-2016-0041814 filed in the Korean Intellectual Property Office on Apr. 5, 2016, the entire contents of which are incorporated herein by reference.

BACKGROUND

(a) Field of the Disclosure

The present disclosure relates to a server, an apparatus, and a method for providing call availability information of a driver. More specifically, the present disclosure relates to a server, an apparatus, and a method for providing information for a call availability time and a call availability type based on driving information of a vehicle.

(b) Description of the Related Art

Mobile phone use while driving is very dangerous to a point that there is a high probability of causing operational errors of a steering wheel, a sudden brake, a signal violation, or a lane violation. To reduce the risk of accidents, the use of a hands-free utility while driving is recommended. However, even if the hands-free utility is used, if a driver is concentrated on a call, an operation concentration reduced such that there is a high possibility that an accident occurs.

For safety, it is desirable to refrain from the use of portable phones while driving. When a phone is ringing or a text message is received, most drivers answer the calls or habitually check text messages. When placing a phone call, because there is no method to accurately know the current status of the call recipient, who may be a driver, It is difficult to realistically consider when making the phone call whether the recipient of the phone call is currently driving. If the driver refuses a phone call for safe driving, since the caller cannot know whether the recipient is driving, it is possible to misunderstand the call rejection of the driver in a different meaning.

If a call is received while a user is driving, some users utilize a method of transmitting a call impossible message to the caller that initiated the call. This message only informs a caller that the intended recipient is in the current call impossible situation. However, the detailed information regarding the current situation and a future call availability time of the driver is not provided to the caller.

The above information disclosed in this Background section is only for enhancement of understanding of the background of the invention and therefore it may contain information that does not form the prior art that is already known in this country to a person of ordinary skill in the art.

SUMMARY

Exemplary forms of the present disclosure provides a server, an apparatus, and a method for providing information for a call availability time and a call availability status of the driver based on the vehicle driving information.

A call availability information providing server according to an exemplary form of the present disclosure includes a driving route calculating unit configured to receive a starting position and destination information transmitted from a vehicle terminal connected through a wireless communication network and to calculate a driving route corresponding to the received starting position and destination information; a call availability information generating unit configured to calculate a driving mode and a passing time per unit interval within the calculated driving route and to generate call availability information based on the calculated driving mode and passing time per unit interval when it is determined that a vehicle installed with the vehicle terminal is driving; and a call availability information transmitting unit configured to transmit the generated call availability information to the vehicle terminal.

The vehicle terminal may include a hands-free function, and the call availability information may further include whether to use the hands-free.

The server may further include a route information database configured to store a distance of the unit interval within the driving route, an average speed of the unit interval, and interval characteristic information, wherein the call availability information generating unit is configured to predict a driving mode based on a road characteristic of the unit interval within the calculated driving route and may calculate a passing time of the unit interval based on the distance of the unit interval and the average speed of the unit interval.

The call availability information generating unit may predict the unit interval as an autonomous driving mode when the unit interval is included in a highway, may predict the unit interval as a manual driving mode when the unit interval is included in a downtown road, and may predict the unit interval as a transition driving mode when the unit interval is included in a boundary of the highway and the downtown.

The call availability information may include information regarding at least one of the driving interval, a speed of the vehicle, whether a video call is possible, whether a voice call is possible, a call availability time, or a weather of the vehicle driving interval.

The mobile device may be paired with the vehicle terminal, and when the call is placed to the mobile device, the mobile device may transmit the call availability information to a call attempt person.

A call availability information providing apparatus including a hands-free function, connected with a mobile device of a vehicle driver, connected to a navigation server through a network, and positioned in a vehicle according to exemplary forms of the present disclosure, includes a driving information collection unit configured to receive a starting position of the vehicle and destination information from the driver for transmission to the navigation server and configured to receive a driving route transmitted from the navigation server; a call availability information generating unit configured to calculate a driving mode and a passing time per unit interval within the received driving route when it is determined that the vehicle is driving and generating call availability information based on the calculated driving mode and passing time per unit interval; and a call availability information transmitting unit configured to transmit the generated call availability information to a call attempt person when the call comes to the mobile device.

The apparatus may further include a route information database configured to store a distance of the unit interval within a driving route, an average speed of the unit interval, and interval characteristic information, the call availability information generating unit may predict a driving mode based on a road characteristic of the unit interval within the calculated driving route and may calculate a passing time of the unit interval based on the distance of the unit interval and the average speed of the unit interval.

The call availability information generating unit may predict the unit interval as an autonomous driving mode when the unit interval is included in a highway, may predict the unit interval as a manual driving mode when the unit interval is included in a downtown road, and may predict the unit interval as a transition driving mode when the unit interval is included in a boundary of the highway and the downtown.

The call availability information may include information regarding at least one of whether to be communication-linked with the mobile device, a driving interval, the speed of the vehicle, whether a video call is possible, whether a voice call is possible, a call availability time, or a weather of the vehicle driving interval.

A method for providing call availability information through a call availability information providing apparatus according to exemplary forms of the present disclosure include transmitting a starting position of a vehicle and a destination information input from a driver to a navigation server; receiving a driving route transmitted from the navigation server; calculating a driving mode and a passing time per the unit interval within the received driving route it is determined that the vehicle is driving; generating call availability information corresponding to the calculated driving mode and passing time per the unit interval; and transmitting the generated call availability information to a call attempt person when a call comes to a mobile device paired with the call availability information providing apparatus.

The step of calculating the driving mode and the passing time per the unit interval may include predicting the driving mode based on a unit interval characteristic within a driving route that is stored in advance to a route information database and calculating the passing time of the unit interval based on the distance of the unit interval and the average speed of the unit interval that are stored in advance.

The step of calculating the driving mode and the passing time per the unit interval may include predicting the unit interval as an autonomous driving mode when the unit interval is included in a highway, predicting the unit interval as a manual driving mode when the unit interval is included in a downtown road, and predicting the unit interval as a transition driving mode when the unit interval is included in a boundary of the highway and the downtown.

The call availability information may include information regarding at least one whether to be paired with the mobile device, the driving interval, the speed of the vehicle, whether a video call is possible, whether a voice call is possible, a call availability time, or a weather of the vehicle driving interval.

In exemplary forms of the present disclosure, the call attempt person (also known as a caller) may call the driver by considering the call time and the call type (voice or image) depending on the current situation of the driver. Also, the driver may receive the incoming call depending on the driving situation to confirm business of the caller and may reduce a risk of accidents caused by the call during driving.

DETAILED DESCRIPTION

In the following detailed description, only certain exemplary forms of the present disclosure have been shown and described, simply by way of illustration. As those skilled in the art would realize, the described forms may be modified in various different ways, all without departing from the spirit or scope of the present disclosure. The drawings and description are to be regarded as illustrative in nature and not restrictive, and like reference numerals designate like or similar elements through the specification. Also, in a case of the well-known technique, detailed description thereof will be omitted.

Throughout this specification and the claims which follow, unless explicitly described to the contrary, the word "comprise" and variations such as "comprises" or "comprising" will be understood to imply the inclusion of stated elements but not the exclusion of any other elements. Also, the terms unit, device, and module in the present specification represent a unit for processing a predetermined function or operation, which can be realized by hardware, software, or a combination of hardware and software.

In the present specification, "a mobile device" means a portable apparatus in which a voice/image call and data communication are possible and a connection with a vehicle terminal by a wire communication or wireless communication is possible. For example, the mobile device may be a cellular phone, a smartphone, a notebook, or a wearable device.

Figure 1:
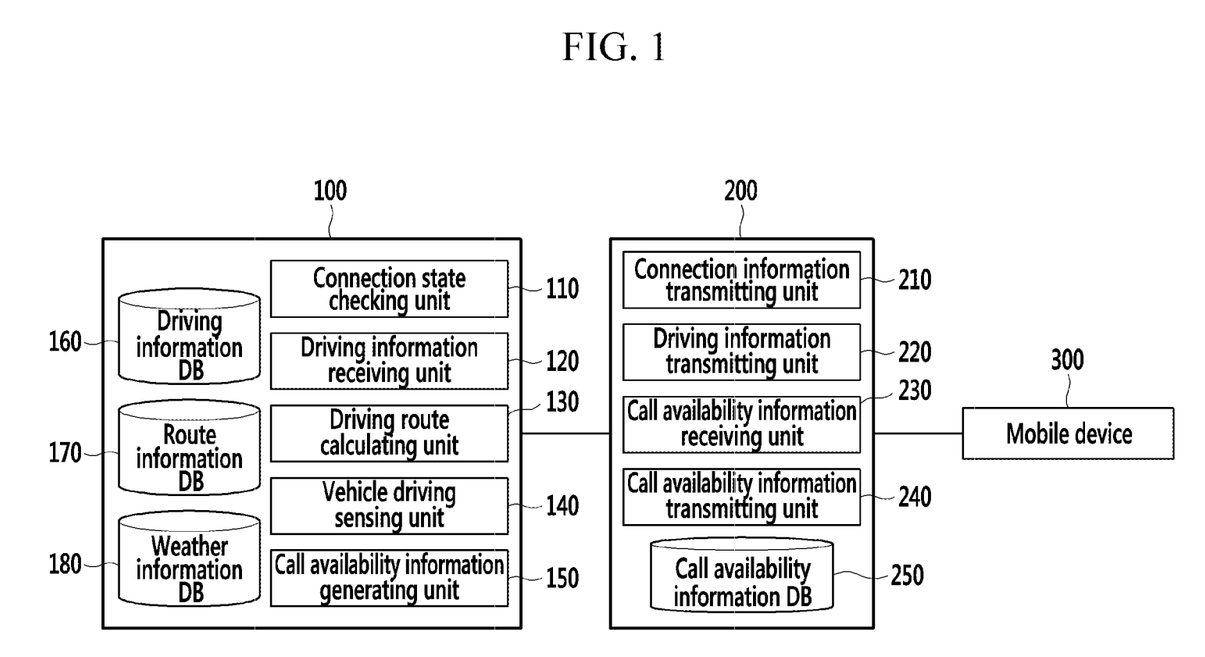
FIG. 1 is a view showing a configuration of a call availability information providing server.

FIG. 1 is a view showing a configuration of a call availability information providing server.

In FIG. 1, a call availability information providing server 100 is connected with a vehicle terminal 200 through a wireless communication network. The vehicle terminal 200 including a hands-free function is connected with a mobile device 300 by a near field communication or a Bluetooth communication.

The call availability information providing server 100 includes a connection state checking unit 110, a driving information receiving unit 120, a driving route calculating unit 130, a vehicle driving sensing unit 140, a call availability information generating unit 150, a driving information database (hereinafter, referred to as 'a driving information DB') 160, a route information database (hereinafter, referred to as 'a route information DB') 170, and a weather information database (hereinafter, referred to as 'a weather information DB') 180.

The connection state checking unit 110 determines a hands-free connection state based on connection information transmitted from the vehicle terminal 200. If the connection information including pairing information of the vehicle terminal 200 and the mobile device 300 is received, the connection state checking unit 110 determines that the driver uses the hands-free function of the vehicle terminal 200. If the received connection information does not include the paring information, it is determined that the driver does not use the hands-free function.

The driving information receiving unit 120 receives the driving information transmitted from the vehicle terminal 200. Here, the driving information includes information regarding at least one of a starting position of the vehicle, a destination, a speed, or a driving mode.

The driving route calculating unit 130 calculates a driving route corresponding to the starting position and the destination among the driving information received through the driving information receiving unit 120. The driving route calculating unit 130 calculates the driving route from the starting position of the driver to the destination by using the interval information stored in the route information DB 170. The interval information includes a distance of a unit interval, an average speed of the unit interval, and an interval characteristic information (a city interval, an inter-chain support, a fast interval, an accident occurred interval, etc.). Here, the unit interval is to divide a road into a plurality of intervals depending on a predetermined reference (e.g., a predetermined distance, a crossing, an accident rate, etc.), and the driving route calculated through the driving route calculating unit 130 may include the plurality of unit intervals.

The vehicle driving sensing unit 140 detects whether the vehicle installed with the vehicle terminal 200 is being driven or not. The vehicle driving sensing unit 140 determines whether the vehicle is being driven depending on a result receiving and analyzing information regarding at least one of the positioned of the vehicle, the starting, the speed, a fuel amount, the communication between the vehicle terminal and a road infra, a black box image, or the position of the driver, that are transmitted from vehicle terminal 200 or the mobile device 300.

The call availability information generating unit 150 generates the call availability information of the driver based on the driving route calculated through the driving route calculating unit 130 and transmits it to the vehicle terminal 200. The call availability information generating unit 140 generates the call availability information of the driver on the operated vehicle when it is determined that the vehicle is currently operated through the vehicle driving sensing unit 140. The call availability information generating unit 150 predicts the driving mode of the vehicle depending on the road characteristic of the unit interval within the driving route and calculates a passing time per unit interval by using the distance of the unit interval and the average speed of the unit interval.

Also, the call availability information generating unit 150 may search a driving mode of the driver corresponding to the road characteristic of the unit interval within the driving route from the driving information DB 160 when it is determined that the vehicle driver is a driver who is registered in advance to the call availability information providing server 100 based on a vehicle identification information transmitted from the vehicle terminal 200. The call availability information generating unit 150 may calculate the passing time per unit interval by using the distance of the unit interval and the average speed of the unit interval.

Further, the call availability information generating unit 150 may generate the call availability information to reflect the weather information of the area including the unit interval of the driving route.

Figure 2:
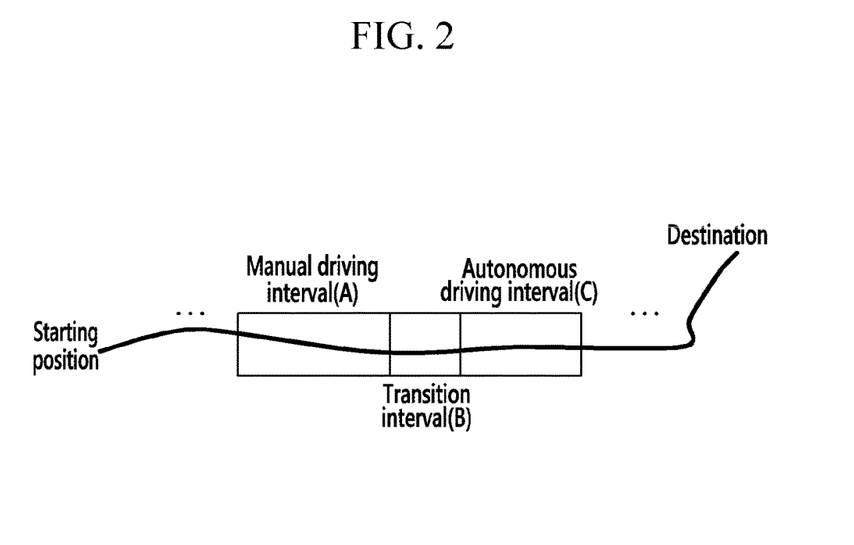
FIG. 2 is a view showing a driving route example calculated by a driving route calculating unit.

FIG. 2 is a view showing a driving route example calculated by a driving route calculating unit.

As shown in FIG. 2, the driving route calculated by the driving route calculating unit 130 includes a manual driving interval A, a transition interval B, and an autonomous driving interval C. The manual driving interval A, the transition interval B, and the autonomous driving interval C include at least one unit interval, respectively.

The driving mode corresponding to the manual driving interval A, the transition interval B, and the autonomous driving interval C may be predicted through at least one information among the driving habit) of the driver stored to the driving information DB 160 or the interval characteristic information of the unit interval stored to the route information DB 170. Here, the autonomous driving interval means an interval that the vehicle is operated without the operation of the driver through a highway driving assistance system, a lane departure warning system, a lane keeping support system, a smart cruise control system, etc., and the manual driving interval means an interval that the vehicle is operated by the direct operation of the driver. Also, the transition interval means an interval that the autonomous driving and the manual driving are mixed to be converted from the autonomous driving to the manual driving, or from the manual driving to the autonomous driving. For example, each interval characteristic stored to the route information DB 170 and the driving mode predict result using the interval characteristic in the driving route including a first 1 interval to a seventh interval are given in Table 1.

TABLE 1

| Interval | First interval | Second interval | Third interval | Fourth interval | Fifth interval | Sixth interval | Seventh interval |
| --- | --- | --- | --- | --- | --- | --- | --- |
| Characteristic | Downtown | Downtown | Inter-change | Inter-change | High speed | High speed | High speed |
| Driving mode | Manual | Manual | Manual-> Auto | Manual-> Auto | Auto | Auto | Auto |

In Table 1, for better comprehension and ease of description, an example that the downtown interval is predicted as the manual driving interval and the high speed interval is predicted as the autonomous driving interval is shown. However, the present disclosure is not limited thereto and the driving mode may be predicted depending on the result determining the interval that the autonomous driving is possible and the interval that the autonomous driving is impossible by considering at least one information among a real time traffic information and a map information through the call availability information generating unit 150.

Figure 3:
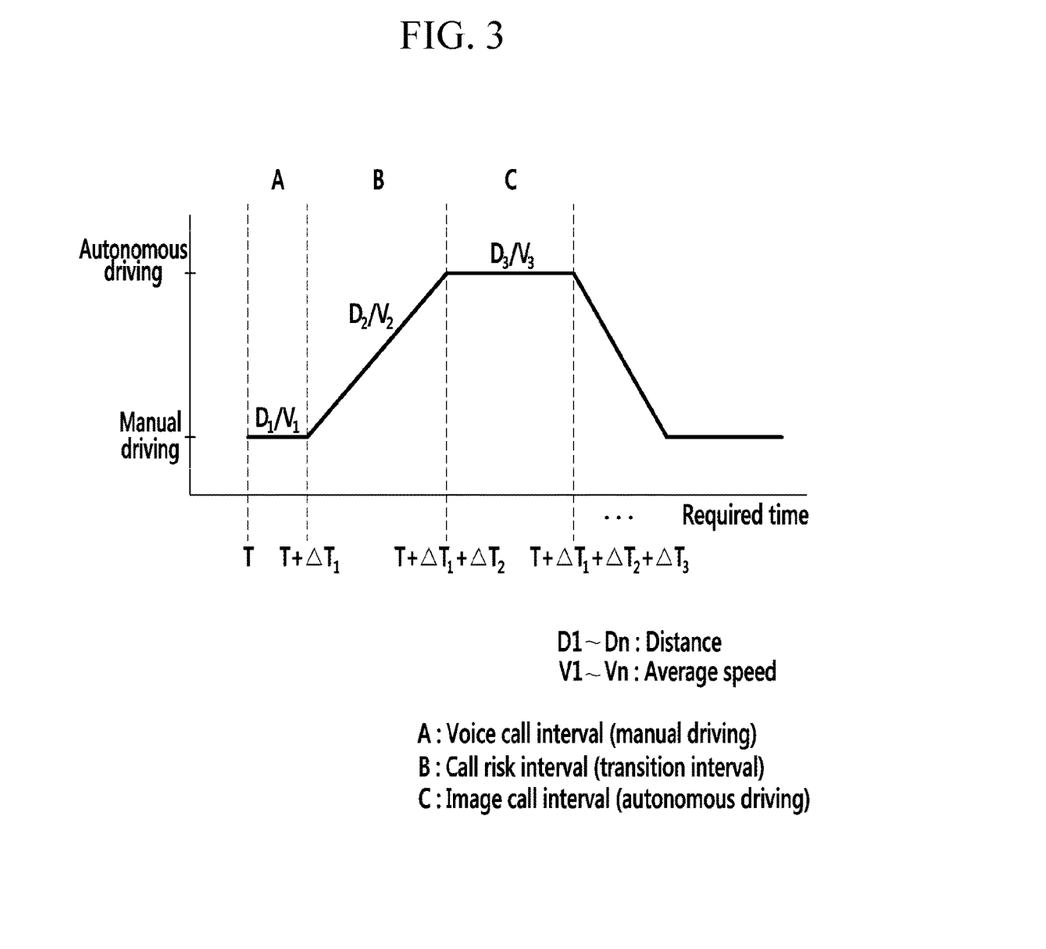
FIG. 3 is a view showing a call availability information example for the driving route of FIG. 2.

FIG. 3 is a view showing a call availability information example for the driving route of FIG. 2.

FIG. 3 represents the driving mode for each interval within the driving route of FIG. 2 and a time required when passing the interval (hereinafter, referred to as 'a requirement time'), T is a current time, D is an interval distance, V is an interval average speed, A is the manual driving interval, B is the transition interval, and C is the autonomous driving interval. In this case, the requirement time $\Delta T_1$, $\Delta T_2$, and $\Delta T_3$ for each interval may be calculated by using the distances $D_1$, $D_2$, and $D_3$ for each interval and the average speeds $V_1$, $V_2$, and $V_3$.

It may be determined that the voice call is only possible because the vehicle is driving in the manual driving interval A that the driver must operate the vehicle between the time T and the time $(T+\Delta T_1)$. Also, it may be determined that the call is not possible because the vehicle is driving in the transition interval B that the driving mode of the driver vehicle is changed between the time $(T+\Delta T_1)$ and the time $(T+\Delta T_1+\Delta T_2)$. Also, it may be determined that the voice call and the video call are possible because the vehicle is driving in the autonomous driving interval C that the driver does not directly operate the vehicle between the time $(T+\Delta T_1+\Delta T_2)$ and the time $(T+\Delta T_1+\Delta T_2+\Delta T_3)$.

Again referring to FIG. 1, the driving information DB 160 stores vehicle identification information, driver identification information, driver driving mode information, etc.

The route information DB 170 stores the distance of the unit interval, the average speed of the unit interval, and the interval characteristic information, etc.

The weather information DB 180 receives and stores the weather information such as an air temperature, precipitation status, rain status, fog status, hail status, and a wind speed for each region transmitted from a National Weather Service server. The weather information DB 180 may be updated by storing the weather information transmitted from the national weather service depending on a predetermined time.

The vehicle terminal 200 may be a telematics terminal including the hands-free function and includes a connection information transmitting unit 210, a driving information transmitting unit 220, a call availability information receiving unit 230, a call availability information transmitting unit 240, and a call availability information database (hereinafter, referred to as 'a call availability information DB') 250.

The connection information transmitting unit 210 transmits the connection information between the vehicle terminal 200 and the mobile device 300 to the call availability information providing server 100. The connection information transmitting unit 210 detects whether the vehicle terminal 200 and the mobile device 300 are pairing to be transmitted to the call availability information providing server 100.

The driving information transmitting unit 220 collects the driving information of the vehicle by the predetermined cycle to be transmitted to the call availability information providing server 100. In exemplary forms of the present disclosure, the driving information transmitting unit 220 collects the starting position information of the vehicle by using a GPS (Global Positioning System) of the vehicle and collects the destination information input from the driver to be transmitted to the call availability information providing server 100. Also, the information related to the speed or the driving mode may be transmitted to the call availability information providing server 100.

The call availability information receiving unit 230 receives the call availability information transmitted from the call availability information providing server 100 to store it to the call availability information DB 250.

The call availability information transmitting unit 240 transmits the call availability information stored to the call availability information DB 250 to the mobile device of a caller through the mobile device 300 when a call is placed to the mobile device 300 that is paired with the vehicle terminal 200.

The call availability information DB 250 stores the call availability information transmitted from the call availability information providing server 100.

Figure 4:
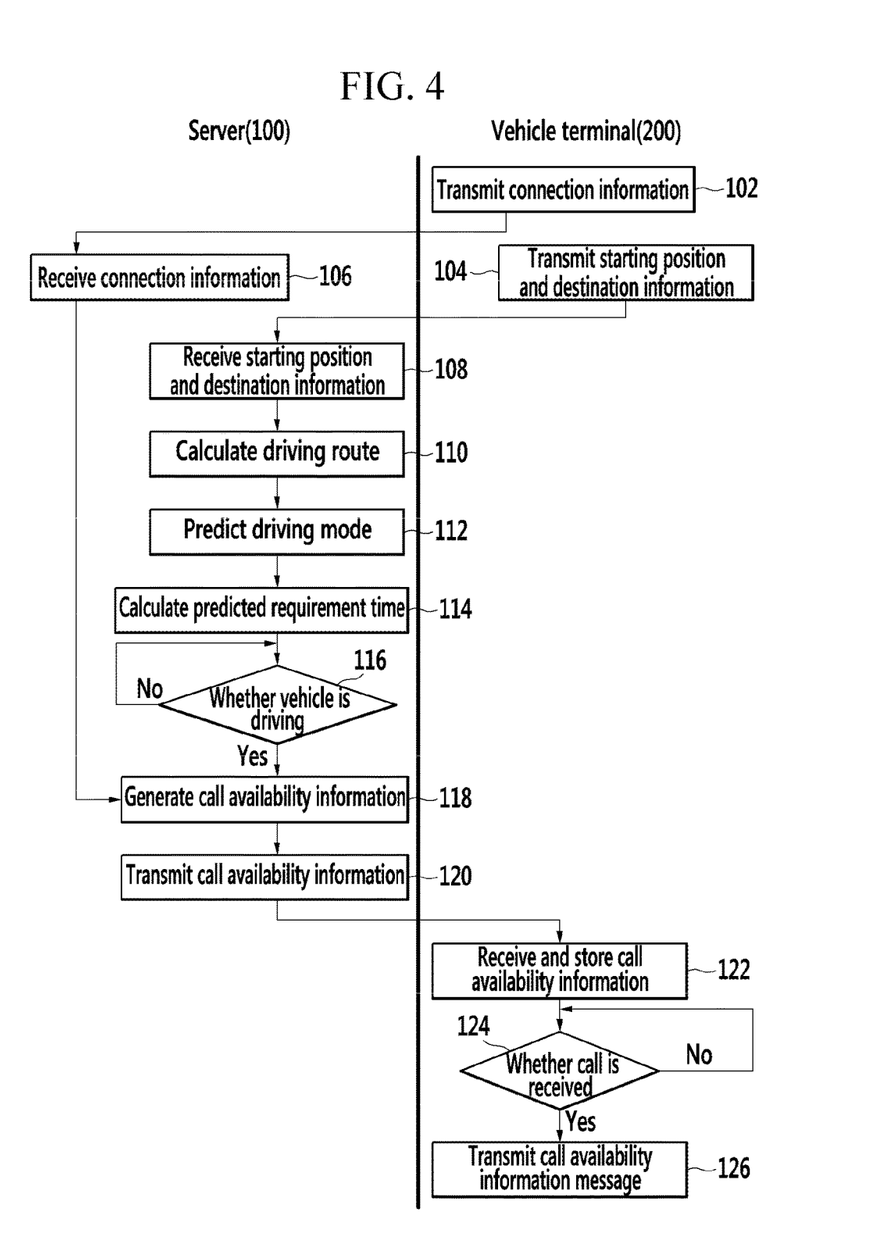
FIG. 4 is a view showing a call availability information providing method using a call availability information providing server.

FIG. 4 is a view showing a call availability information providing method using a call availability information providing server.

The vehicle terminal 200s transmits the connection information between the vehicle terminal 200 and the mobile device 300 to the server 100 through the connection information transmitting unit 210 (S102).

The vehicle terminal 200 receives the starting position of the vehicle through the driving information transmitting unit 220 and the destination information input from the driver to be transmitted to the server 100 (S104).

The server 100 receives the connection information through the connection state checking unit 110 and determines whether there is a pairing of the vehicle terminal 200 and the mobile device 300 (S106).

Also, the server 100 receives the starting position and destination information through the driving information receiving unit 120 (S108).

The server 100 calculates the driving route through the driving route calculating unit 130 based on the starting position and destination (S110).

The server 100 predicts the driving mode for each interval according to the road characteristic of the unit interval within the driving route through the call availability information generating unit 150 (S112) and calculates the passing time for each interval by using the distance of the unit interval and the average speed of the unit interval (S114).

If the vehicle driving is detected through the vehicle driving sensing unit 140 (S116), the server 100 generates the call availability information (S118) and transmits it to the vehicle terminal 200 (S120) based on the pairing determining result of the step (S106) through the call availability information generating unit 150, the driving mode predict result of the step (S112), and the passing time calculate result of the step (S114).

The vehicle terminal 200 receives and stores the call availability information through the call availability information receiving unit 230 (S112).

When the call comes from the call attempt person through the mobile device 300 (S124), the vehicle terminal 200 transmits the call availability information received in the step (S112) through the call availability information transmitting unit 240 to the call attempt person (S126). If the call availability information is transmitted to the mobile device 300 through the call availability information transmitting unit 240, the call availability information of a message shape may be transmitted to the call attempt person from the mobile device 300.

Figure 5:
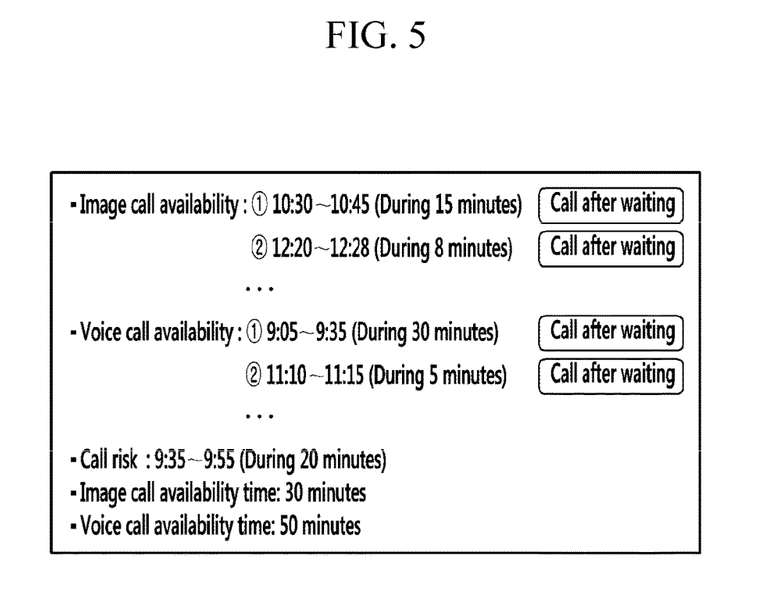
FIG. 5 and FIG. 6 are views showing a call availability information message example.
Figure 6:
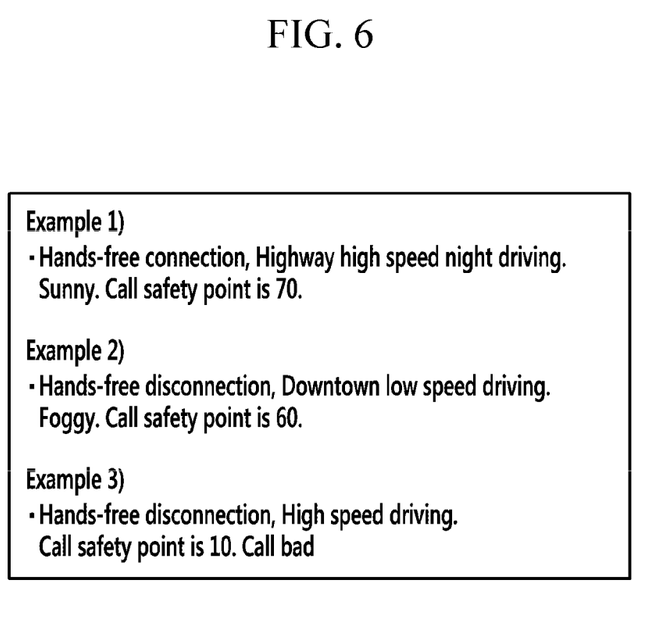

FIG. 5 and FIG. 6 are views showing a call availability information message example.

As shown in FIG. 5, the information such as the call availability time, the call availability call type, and the call risk may be transmitted to the call attempt person.

As shown in FIG. 6, whether the hands-free connection, the current driving situation (the driving interval, the speed, the weather, etc.) and a call safety point according thereto may be transmitted to the call attempt person.

Figure 7:
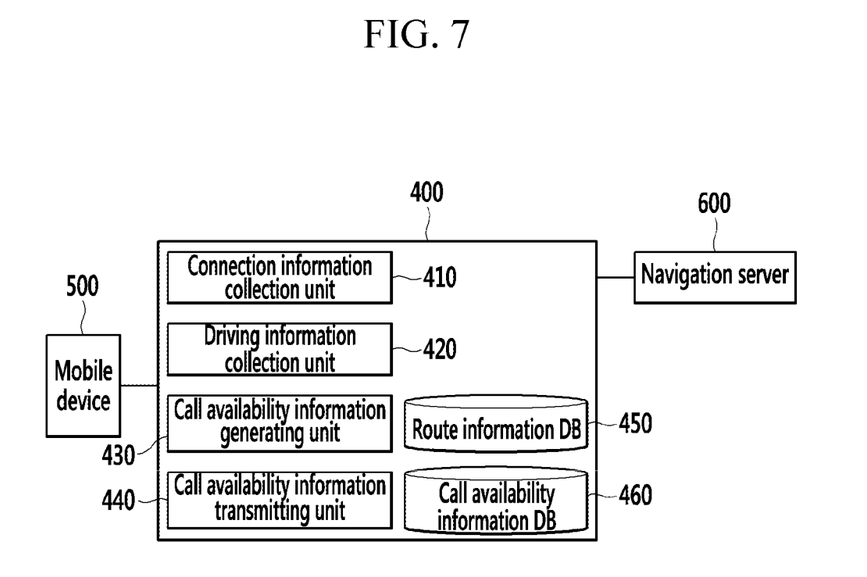
FIG. 7 is a view showing a configuration of a call availability information providing apparatus.

FIG. 7 is a view showing a configuration of a call availability information providing apparatus according to an exemplary form of the present disclosure.

In FIG. 7, a call availability information providing apparatus 400 is realized by a vehicle terminal having the hands-free function and includes a connection information collection unit 410, a driving information collection unit 420, a call availability information generating unit 430, a call availability information transmitting unit 440, a route information DB 450, and a call availability information DB 460.

The connection information collection unit 410 connects the connection information between the call availability information providing apparatus 400 and the mobile device 500. Here, the connection information includes whether to activate the hands-free functionality through the call availability information providing apparatus 400.

The driving information collection unit 420 collects the driving information of the vehicle. The driving information collection unit 420 collects the starting position of the vehicle and the destination information input from the driver. Also, the driving information collection unit 420 transmits the collected starting position and destination information to the navigation server 600 and receives the driving route transmitted from the navigation server 600. Also, the driving information collection unit 420 may further collect the vehicle speed information.

The call availability information generating unit 430 generates the call availability information of the vehicle driver based on the vehicle speed collected through the driving information collection unit 420 when it is determined that the vehicle is currently driving. The call availability information generating unit 430 predicts the driving mode of the vehicle according to the road characteristic of the unit interval within the driving route by using the route information stored to the route information DB 450 and calculates the passing time per unit interval by using the distance of the unit interval and the average speed of the unit interval. Next, the call availability information generating unit 430 generates the call availability information and stores it to the call availability information DB 460 by reflecting the hands-free activation information collected through the connection information collection unit 410.

When a call is placed to the mobile device 500 connected with the call availability information providing apparatus 400, the call availability information transmitting unit 440 transmits the call availability information stored to the call availability information DB 460 to the mobile device of the caller through the mobile device 500.

The route information DB 450 stores the distance of the unit interval, the average speed of the unit interval, and the interval characteristic information, etc.

The call availability information DB 460 stores the call availability information generated through the call availability information generating unit 430.

Figure 8:
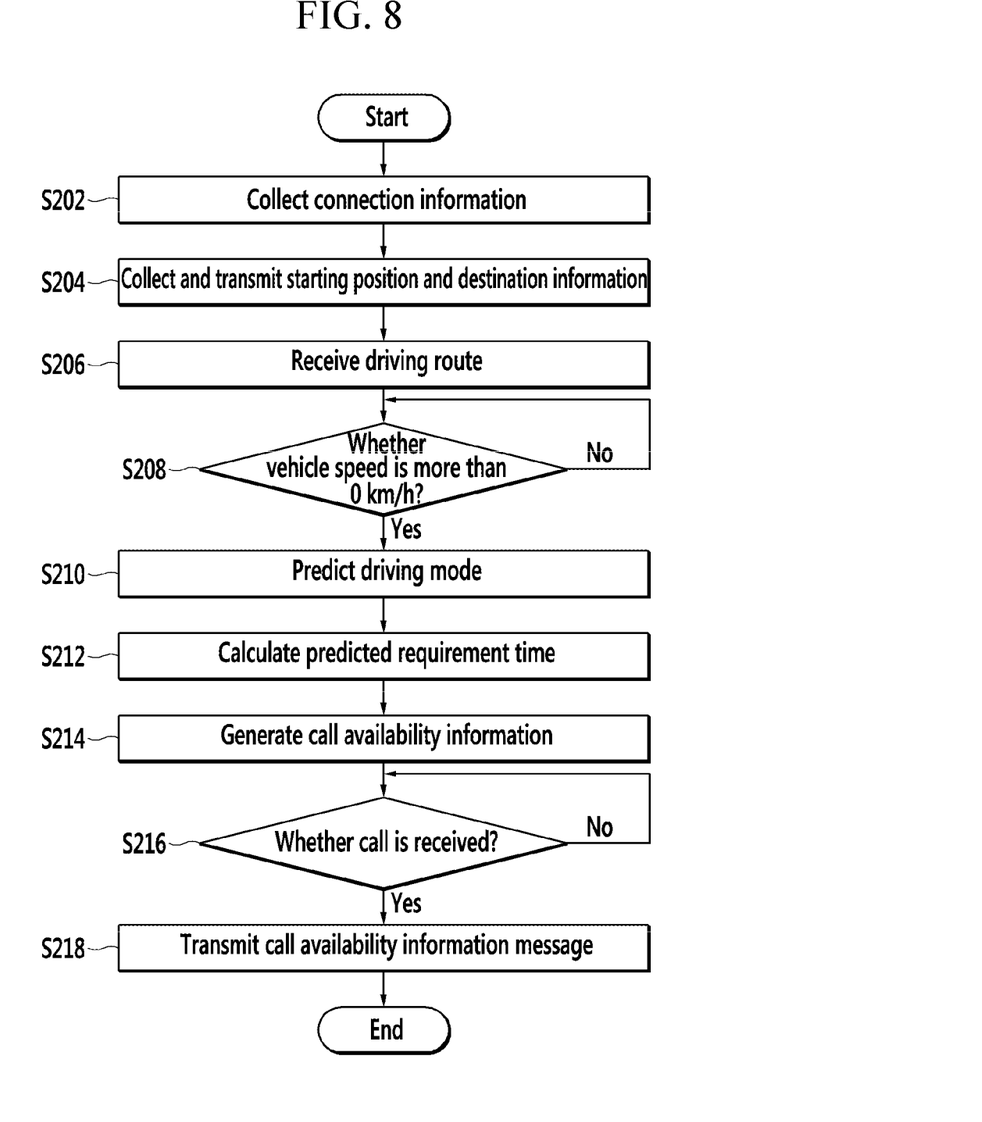
FIG. 8 is a view showing a call availability information providing method using the call availability information providing apparatus of FIG. 7.

FIG. 8 is a view showing a call availability information providing method using the call availability information providing apparatus of FIG. 7.

The call availability information providing apparatus 400 collects the connection information with the mobile device 500 through the connection information collection unit 410 (S202).

The call availability information providing apparatus 400 receives the starting position of the vehicle through the driving information collection unit 420 and the destination information input from the driver to be transmitted to the navigation server 600 (S204).

The call availability information providing apparatus 400 receives the driving route transmitted from the navigation server 600 through the driving information collection unit 420 (S206).

The call availability information providing apparatus 400 determines that the vehicle is driving when the vehicle speed collected through the driving information collection unit 420 is more than 0 km/h (S208).

When it is determined that the vehicle is driving in the step (S208), the call availability information providing apparatus 400 predicts the driving mode of the vehicle according to the road characteristic of the unit interval within the driving route through the call availability information generating unit 430 (S210) and calculates a predicted requirement time per unit interval driving by using the distance of the unit interval and the average speed of the unit interval (S212).

The call availability information providing apparatus 400 generates the call availability information including at least one information among whether to use the hands-free in the connection information in the step (S202), the driving mode of the step (S210), the predicted requirement time in the step (S212) (S214).

Next, the call availability information transmitting unit 440 detects that the call comes to the mobile device 500 (S216) and transmits the call availability information generated in the step (S214) to the call attempt person (3218).

The call availability information providing method according to exemplary forms of the present disclosure may be installed to the apparatus or may be realized as a program that is directly installed by the used, thereby being recorded to a recording medium that may be read by a computer. Here, the computer may include a desk top, a laptop, a smart phone, a tablet PC, a PDA (a personal information terminal device), a mobile communication device, etc. Also, the recording medium may include a ROM, a RAM, a CD-ROM, a magnetic tape, a floppy disk, and an optical media storage device.

Accordingly, the program realizing the call availability information providing method according to exemplary forms of the present disclosure may perform the function collecting the connection information of the vehicle terminal and the mobile device, the function receiving the driving route corresponding to the starting position of the vehicle and the destination information, the function generating the call availability information based on the driving route, and the function transmitting the call availability information to the call attempt person when the call comes to the mobile device from the call attempt person.

In exemplary forms of the present disclosure, the call attempt person may confirm the current situation of the receiver (the driver) and may attempt the call by considering the time and availability of a type of call. Also, since the real time position of the driver is collected to generate the call availability information, an accuracy of the information provided to the call attempt person may be improved. Also, if the call is coming while driving, the driver may transmit the call availability information to the call attempt person to inform the situation that cannot receive the call and may drive safe.

While this disclosure has been described in connection with what is presently considered to be practical exemplary forms, it is to be understood that the disclosure is not limited to the disclosed forms, but, on the contrary, is intended to cover various modifications and equivalent arrangements included within the spirit and scope of the appended claims.

DESCRIPTION OF SYMBOLS

- 100: call availability information providing server
- 110: connection state checking unit
- 120: driving information receiving unit
- 130: driving route calculating unit
- 140: vehicle driving sensing unit
- 150: call availability information generating unit
- 160: driving information DB
- 170: route information DB
- 180: weather information DB
- 200: vehicle terminal
- 210: connection information transmitting unit
- 220: driving information transmitting unit
- 230: call availability information receiving unit
- 240: call availability information transmitting unit
- 250: call availability information DB
- 300: mobile device

What is claimed is:

1. A call availability information providing server comprising:
   a computer processor configured to:
      receive, using a driving route calculating unit, a starting position and destination information transmitted from a vehicle terminal connected through a wireless communication network and to calculate a driving route corresponding to the received starting position and destination information;
      calculate, using a call availability information generating unit, a driving mode and a passing time per unit interval within the calculated driving route and to generate call availability information based on the calculated driving mode and the passing time per unit interval when it is determined that a vehicle installed with the vehicle terminal is driving; and
      transmit, using a call availability information transmitting unit, the generated call availability information to the vehicle terminal;
   a route information database configured to:
      store a distance of the unit interval within the driving route, an average speed of the unit interval, and an interval characteristic information; and
   wherein the call availability information generating unit is configured to:
      predict a driving mode based on a road characteristic of the unit interval within the calculated driving route; and
      calculate a passing time of the unit interval based on the distance of the unit interval and the average speed of the unit interval.

2. The call availability information providing server of claim 1, wherein the vehicle terminal includes a hands-free function, and wherein the call availability information further includes whether to use the hands-free.

3. The call availability information providing server of claim 1, wherein the call availability information generating unit is configured to predict the unit interval as an autonomous driving mode when the unit interval is included in a highway, to predict the unit interval as a manual driving mode when the unit interval is included in a downtown road, and to predict the unit interval as a transition driving mode when the unit interval is included in a boundary of the highway and the downtown.

4. The call availability information providing server of claim 1, wherein the call availability information includes information regarding at least one of the driving interval, a speed of the vehicle, whether a video call is possible, whether a voice call is possible, a call availability time, or a weather of the vehicle driving interval.

5. The call availability information providing server of claim 1, wherein when the mobile device is paired with the vehicle terminal, when the call comes to the mobile device, the mobile device is configured to transmit the call availability information to a call attempt person.

6. A call availability information providing apparatus including a hands-free function, connected with a mobile device of a vehicle driver, connected to a navigation server through a network, and positioned in a vehicle, comprising:
   a computer processor configured to:
      receive, using a driving information collection unit, a starting position of the vehicle and a destination information from the driver for transmission to the navigation server and to receive a driving route transmitted from the navigation server;
      calculate, using a call availability information generating unit, a driving mode and a passing time per unit interval within the received driving route when it is determined that the vehicle is driving and generating a call availability information based on the calculated driving mode and passing time per unit interval; and
      transmit, using a call availability information transmitting unit, the generated call availability information to a call attempt person when the call comes to the mobile device;
   a route information database configured to:
      store a distance of the unit interval within a driving route, an average speed of the unit interval, and an interval characteristic information; and
   wherein the call availability information generating unit is configured to:
      predict a driving mode based on a road characteristic of the unit interval within the calculated driving route; and
      calculate a passing time of the unit interval based on the distance of the unit interval and the average speed of the unit interval.

7. The call availability information providing apparatus of claim 6, wherein the call availability information generating unit is configured to predict the unit interval as an autonomous driving mode when the unit interval is included in a highway, to predict the unit interval as a manual driving mode when the unit interval is included in a downtown road, and to predict the unit interval as a transition driving mode when the unit interval is included in a boundary of the highway and the downtown.

8. The call availability information providing apparatus of claim 6, wherein the call availability information includes information regarding at least one of whether to be communication-linked with the mobile device, a driving interval, the speed of the vehicle, whether a video call is possible, whether a voice call is possible, a call availability time, or a weather of the vehicle driving interval.

9. A method for providing a call availability information through a call availability information providing apparatus, comprising:
   transmitting a starting position of a vehicle and a destination information input from a driver to a navigation server;

receiving a driving route transmitted from the navigation server;

calculating a driving mode and a passing time per the unit interval within the received driving route it is determined that the vehicle is driving;

generating call availability information corresponding to the calculated driving mode and passing time per the unit interval; and transmitting the generated call availability information to a call attempt person when a call comes to a mobile device paired with the call availability information providing apparatus;

wherein the step of calculating the driving mode and the passing time per the unit interval includes predicting the driving mode based on a unit interval characteristic within a driving route that is stored in advance to a route information database and calculating the passing time of the unit interval based on the distance of the unit interval and the average speed of the unit interval that are stored in advance.

10. The call availability information providing method of claim 9, wherein the step of calculating the driving mode and the passing time per the unit interval includes predicting the unit interval as an autonomous driving mode when the unit interval is included in a highway, predicting the unit interval as a manual driving mode when the unit interval is included in a downtown road, and predicting the unit interval as a transition driving mode when the unit interval is included in a boundary of the highway and the downtown.

11. The call availability information providing method of claim 9, wherein the call availability information includes information regarding at least one of whether to be paired with the mobile device, the driving interval, the speed of the vehicle, whether a video call is possible, whether a voice call is possible, a call availability time, or a weather of the vehicle driving interval.

* * * * *